3,199,630
POSITION SENSING DEVICES, PARTICULARLY IN HOISTING AND CONVEYING SYSTEMS
Walter Engel, Friedrich Kuhrt, Hans-Joachim Lippmann, and Walter Hartel, all of Nurnberg, Germany, assignors to Siemens-Schuckertwerke Aktiengesellschaft, Berlin-Siemensstadt, Germany, a corporation of Germany
Filed Aug. 12, 1959, Ser. No. 833,185
Claims priority, application Germany, Jan. 24, 1958, S 56,700; Sept. 9, 1958, S 59,754; Sept. 25, 1958, S 60,050
6 Claims. (Cl. 187—29)

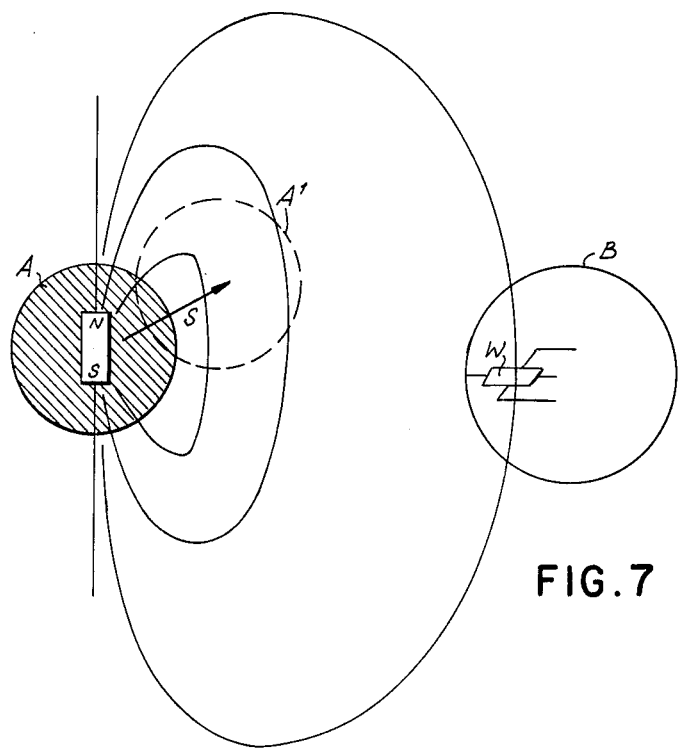
FIG.7
FIG.8
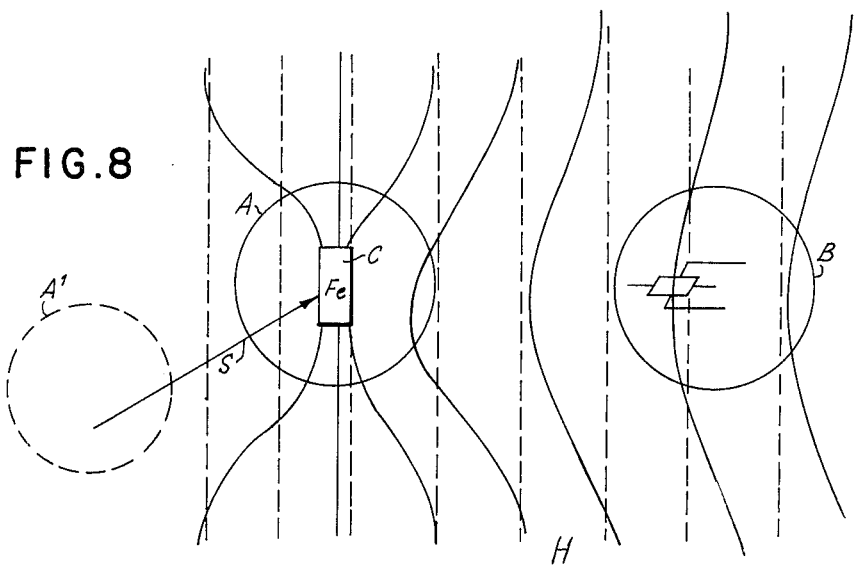

Our invention relates to position-responsive sensing devices, such as used in hoisting or conveying systems, for the issuance of switching signals from a transmitting unit to a receiving unit of which one is stationary and the other is movable together with a travelling or object.

This application is a continuation-in-part of our application Serial No. 788,404, filed January 22, 1959, now abandoned.

For example, in elevator or other hoisting systems the position of the car or cage being hoisted or lowered must be sensed by means of an electric device which issues electric signals for controlling the hoisting operation as to speed and direction, or for placing the cab into given landing positions. It is known for this purpose to mount one or more permanent magnets on the cab of a hoist which act upon receivers in the form of magnetic switches which are distributed along the shaftway and perform a mechanical switching motion when the transmitter magnet passes by the respective receiver locations. Such magnetic switches, operating with movable contacts, are not sufficiently reliable without frequent inspection and careful maintenance. Such aggravating conditions as high humidity, extreme changes in temperature, explosion resistance in hazardous locations, or resistance to impact and shock in rugged use, involve extremely exacting requirements as regards sturdiness in design and reliability of operation.

It is an object of our invention to eliminate the disadvantages of the known magnetical sensing devices and to secure reliable operation under all operating conditions with a minimum expenditure in structure and space requirements. Another object, akin to the one mentioned, is to provide a completely static control device for the above-mentioned purposes that does away with all mechanically movable control components.

It is known as such to avoid the use of movable components in magnetically controlled switching devices by utilizing the induction principle, according to which a permanent magnet travelling past a stationary magnet system induces voltages in a winding of the system. The magnitudes of the induced voltages essentially depends upon the travelling speed of the permanent magnet. In elevator or other hoisting devices, however, the speed of the cab must be greatly reduced when landing so that the induced voltages in devices of the type just mentioned may become much too small for reliable operation.

It is therefore a more specific object of our invention to also eliminate the disadvantages of the inductively operating magnetic control devices and to provide a magnetic sensing system that does not respond to the rate change of the magnetic field, but rather to the magnetic field itself.

According to our invention, the magnetic-field responsive receiver, which forms the sensing unit in a control system of the above-mentioned type, comprises as its essential sensing element a magnetically responsive semiconductor body, namely a magnetic-field responsive semiconductor resistance or a Hall voltage generator. The semiconductor material is preferably chosen from the known group of $A_{III}B_V$ semiconductor compounds consisting of intermetallic binary compounds of respective elements from the third and fifth B-groups of the periodic system of elements. We prefer using indium arsenide or indium antimonide.

According to a more specific feature of the invention, the magntically responsive semiconductor body is located in a gap of an open magnetic circuit consisting of magnetizable material, preferably iron of high permeability. This open circuit forms two pole ends that are spaced from each other and whose respective pole faces are located preferably in the same plane. The transmitter, consisting of a permanent magnet or electromagnet, has a travel path extending in front of the pole faces so as to energize and magnetize the magnetic circuit when sufficiently approaching the sensing unit. Of course, the magnet may be kept stationary and the unit may travel on a path extending past the magnet.

By virtue of the above-mentioned features, the invention provides a receiver or sensing head which does not contain any movable switch contacts and which, therefore, is neither subjected to any wear nor ever exposed to sparking or arcing so that a nearly unlimited useful lifetime is obtained. Furthermore, the sensing head can be made extremely stable, rugged and insensitive to extraneous influences by embedding it in a non-magnetic envelope, particularly in a housing or casting. Thus, the sensing head may be solidly embedded as a whole in a body of casting resin. Such a completely encapsuled unit is virtually insensitive to all expectable extraneous effects occurring during operation under any of the above-mentioned aggravated conditions.

The invention, therefore, is especially advantageous for mine hoists or the like, but is analogously applicable generally for other conveying and transporting purposes.

For example, when conveying goods or living beings on belts, chains, rails, ropes, or along a gaseous or liquid conevying path or on similarly fixed paths of travel, one or more magnetic-field producing devices, such as one or more permanent magnets or electromagnets, may be disposed at one or more locations of the conveying flow to operate as transmitter which, when approaching the vicinity of one or more sensing heads, change the resistance of the semiconductor resistor or causes the Hall generator to produce a voltage, the resulting voltage or voltage change serving as a control signal for initiating a predetermined change in conveying operation. The invention is similarly applicable for the issuance or transmission of control signals in materials handling and lifting devices, assembly line conveyors, cable-car railroads and the like purposes.

The signal produced by the sensing head may serve to release a variety of operations depending upon the type of conveying system and the purposes served thereby. For example, the control signal may have the effect that the goods following the transmitter are subjected to different processing than the preceding goods. This is applicable, for example, in manufacturing or finishing plants where articles made in mass production are to be processed in respectively different ways, for example, are to be varnished or painted differently. For such purposes, each individual object being conveyed and requiring a specific processing is provided with a magnet to serve as a transmitter so that this particular object will be subjected to special processing. By thus attaching several transmitters, or transmitters of respectively different magnetic-field properties, a multiple selection can be achieved so that not only two different types of processing but any desired greater number can be automatically controlled. Thus, the transmitter may contain permanent magnets or electromagnets of respectively different magnetizing direction (polarization), in order to effect a respectively different control of one or more receivers, so that by suitable combination a multiplicity of respectively different control signals is issued in this manner.

The signal transmission may also serve to switch goods from one to another conveying path, as is desirable in manufacturing plants, for example in a transfer assembly line, for the purposes of applying a different finishing treatment to various objects or respective series of objects.

The invention is further suitable for the sensing and transmitting of the mutual position of two or more objects movable relative to each other. Thus, the invention may be used for determining the location of an object, for controlling and regulating a travelling motion and the like operations in which it is essential to sense the instantaneous location of at least one movable object in order to cause it to pass into predetermined positions, or to maintain a given spacing between two or more objects from each other. An example of such a positional control is the automatic leveling of hoists or elevators at a given landing or floor.

A control system according to the invention may be equipped with two or more transmitter members to act upon a single receiver member. Conversely, two or more receiver members may be acted upon by a single transmitter member. A transmitter may be magnetically active as mentioned above, or it may be inactive. That is, the transmitter member may directly produce a magnetic field, as is the case with a permanent magnet or an electromagnet, or the transmitter member may act to affect or modify a given magnetic field produced by other means. The magnetic control imposed by the transmitter member upon the sensing head may be of the geometric type; that is, it may be constituted by displacement or bunching of magnetic field lines. However, the control effect of the transmitter member upon the sensing head may also involve a superposition and reversing of the flux direction, particularly if an extraneously produced magnetic field is influenced by a magnetically active transmitter. The possibilities of magnetically controlling the sensing head by the transmitting member consist generally in strengthening or weakening the field. Such strengthening or weakening may also be modified or modulated in any desired manner. It is also possible to provide for temporal staggering of magnetic-field changes, for example by operating with pulse sequences or rhythmic influences of given frequencies to produce a weakening, superposition, or any other permanent or short-lasting variation of magnetic values in the rhythm of the transmitter operation.

The semiconductor body whose ohmic resistance is responsive to a magnetic field for either producing a change in voltage drop or generating a Hall voltage, is preferably mounted in a gap formed by a U-shaped yoke of magnetically soft iron, or in a similar open magnetic circuit which causes bunching of the magnetic field in the gap where the semiconductor body is located. If desired, a plurality of such magnetically sensitive semiconductor members may be located in one and the same gap of the yoke structure. However, for sensing magnetic fields of respectively different directions, a plurality of yoke systems or a common magnetizable system with respectively different gaps may be provided, the magnetic-field responsive semiconductor bodies being located in the respective gaps.

In general, the magnetic-field responsive sensing heads in systems according to the invention require the use of amplifiers. Preferable for this purpose are amplifiers of the static type, particularly transistor amplifiers of the relaxation or push-pull type. Such a transistor-amplifier can be built together with the sensing head to form a single unit, thus providing a device, entirely free of mechanically movable contacts, to which any relays or contactors for the control of electric motors may be connected. Such relays, contactors or other devices are preferably located remote from the sensing and amplifying unit.

The control current passing through the semiconductor body of the magnetic-field responsive resistance device may be modulated in any suitable manner. For example, the current may be pulsating or may be alternating current of a given frequency. In an analogous manner, the magnetic field produced by an electromagnet to serve as the transmitter member may be modulated, for example by producing the field with the aid of pulsating current or an alternating current of a given frequency.

The foregoing and other objects, advantages and features of our invention will be apparent from, and will be mentioned in the following with reference to the embodiments of devices according to the invention illustrated by way of example in the accompanying drawings, in which:

FIGS. 7 and 8 are explanatory diagrams of two different modes of operation of a device according to the invention.

Figure 9:
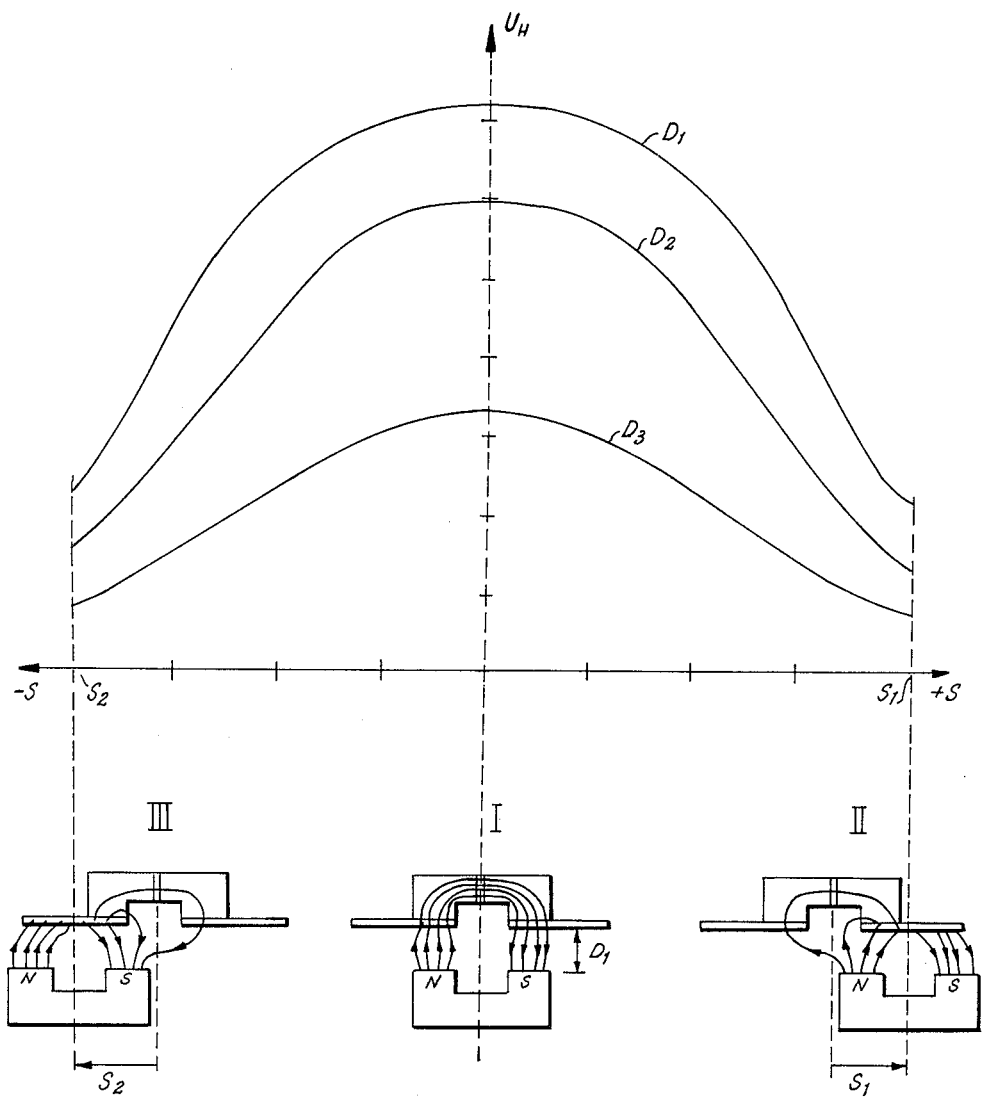
Figure 10:
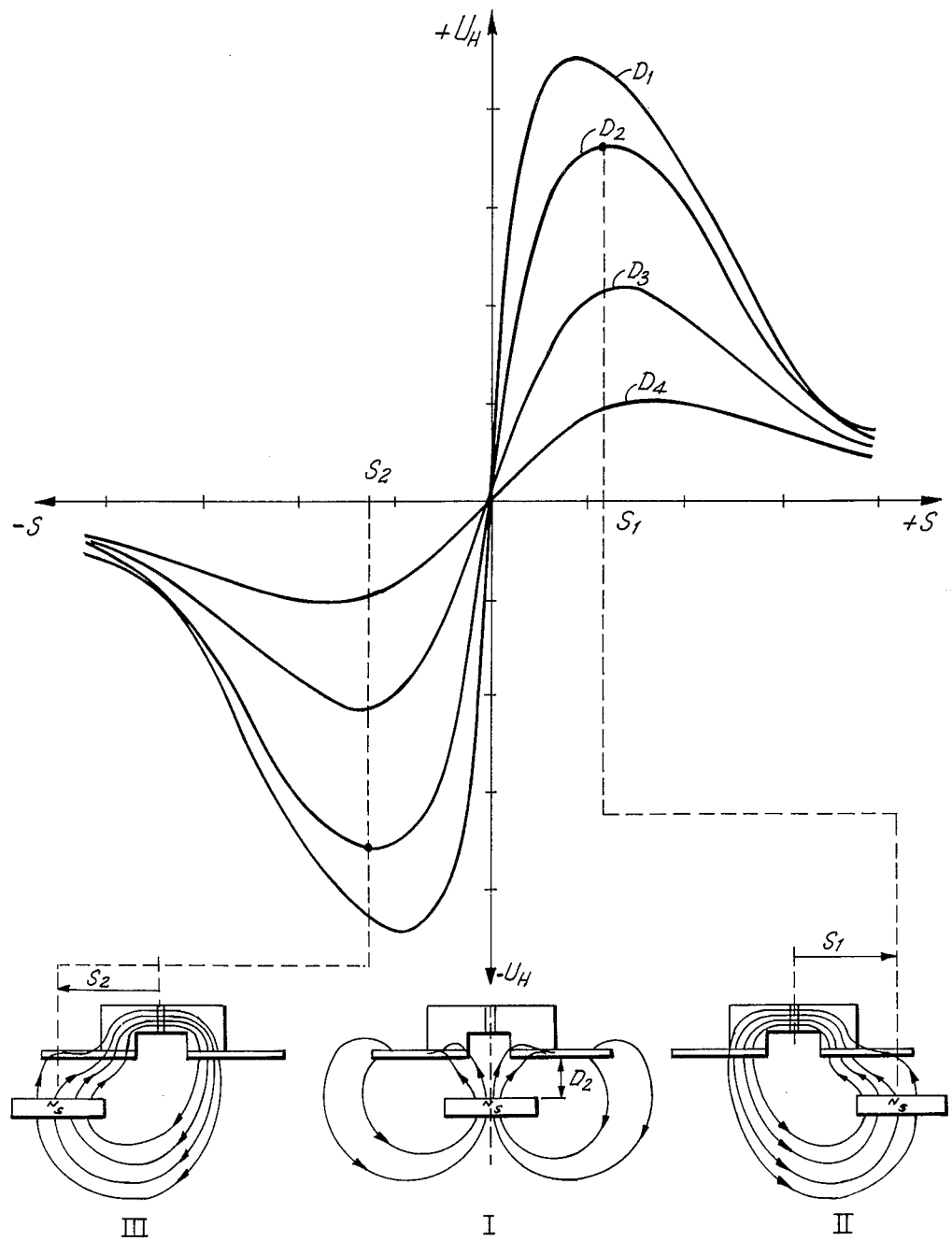

FIGS. 9 and 10 present diagrams and graphs illustrating the dependance of the Hall voltage $U_H$ of a Hall generator upon the position of the magnets of respectively different shape, which are moved in the direction of the paths $s$.

A receiver or sensing head shown in FIG. 7 comprises a U-shaped yoke composed of two L-shaped limbs 1 and 2. The limbs 1 and 2 form between each other a narrow gap in which a semiconductor wafer 3 is mounted. The wafer may be provided with two terminals at two opposite ends to operate as an ohmic resistor which changes its ohmic resistance when subjected to a magnetic field between limbs 1 and 2. However, the wafer 3 may also form a Hall generator, as more fully described below with reference to FIG. 2. The wafer 3 may consist of germanium but is preferably made of induim antimonide (InSb) or indium arsenide (InAs).

The two limbs 1 and 2 are fastened together by means of non-magnetic materials, such as brass or synthetic plastic. In the particular embodiment shown, the two limbs are pressed against non-magnetic block 4 by means of two screw bolts 5, 6 and two pressure plates 7, 8 of brass. The limbs 1 and 2 form an open magnetic circuit whose pole faces 1a and 2a are located in a common plane which extends parallel to the travelling direction of a permanent magnet 9, this direction being identified by an arrow 10. As will be described below, the poles of the magnetizable yoke structure, consisting of soft-magnetic iron may be provided with extended pole sheets in order to facilitate a penetration of magnetic field lines into the yoke from a greater distance.

While in the foregoing reference is made to travelling motion of the transmitter magnet 9 in a direction parallel to the plane of the pole faces 1a, 2a, the operation may also be such that the magnet 9 travels in a direction perpendicular to the plane of illustration. For operation according to the illustrated possibility, the magnet 9 is preferably magnitized so as to have its north pole N and south pole S located on respective opposite sides seen in a direction normal to the plane of pole faces 1a, 2a. However, the magnet 9 may also be so polarized as to have north and south poles located at the respective right and left ends of the magnet, particularly in cases where the magnet is to travel in a direciton perpendicular to the plane of illustration.

Figure 1:
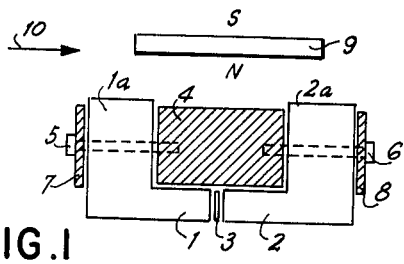
FIGS. 1 and 2 show schematically two different sensing heads cooperating with a permanent magnet.
Figure 3:
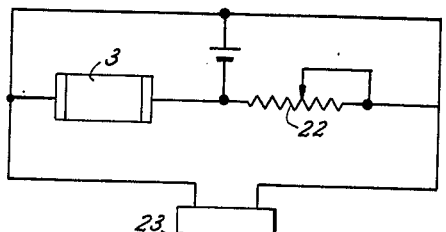
FIG. 3 is a circuit diagram suitable for a sensing head according to FIG. 1.
Figure 3:
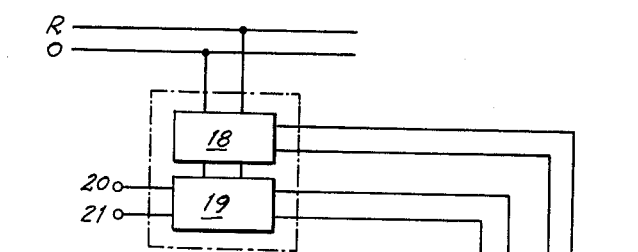

An example of an electric circuit for a variable-resistance sensing head of the type shown in FIG. 1 is illustrated in FIG. 3. The semiconducting resistance wafer 3 is connected serially with an adjustable balancing resistor 22 in the imput circuit of an amplifier 23 and is energized from a current source in voltage-opposed relation to resistor 22 which is so adjusted that the resultant input voltage of the amplifier is zero when the yoke structure of the sensing head is not subjected to a magnetic field. The approach of magnet 9 then causes the voltage drop of wafer 3 to preponderate over that of the resistor 22, thus causing the amplifier 23 to receive a signal voltage which, in amplified condition, is used for actuating a relay 24 or other apparatus to be controlled.

The amplifier used in conjunction with the semiconductor receiver device is preferably of the static type, a transistor amplifier of the relaxation or push-pull type being preferable. The transistor amplifier may be mounted together with the sensing head or may be installed at the same place as the receiver. If desired, however, the amplifier may be installed remote from the semiconductor receiver. For example, in mineshaft installations, the amplifier may be mounted outside of the shaft. While normally the relays, contactors or other devices operated by the amplifier are mounted remote therefrom, some of these relaying devices may also be combined with the amplifier to form a single unit together therewith.

As mentioned, the invention is of particular advantage in all cases where a reliable control is to be obtained independently of the travelling speed of the transmitter or receiver. The invention is also of advantage in systems or plants where a relatively large spacing between receiver and transmitter is necessary, so that it is impossible to obtain a direct, or nearly direct, contact between transmitter and receiver. For example, the invention is useful in cases where a travelling vehicle is to issue control signals upon the travelling path itself. In this manner, an automatic control of switches in the rail systems of railroads or street-cars can be effected. For this purpose, one or more transmitters are mounted on the underside of the vehicle and occupy respectively different positions depending upon the desired positioning of the rail switches, or the respective transmitters are given different magnetization to operate in the just-mentioned manner. The receiving devices that cause reversing of the switches are located along the rails or travelling path of the vehicle.

For the transmission of diversified control commands, the above-described fundamental components on the transmitter and/or receiver side can be doubled or multiplied. For example, several transmitters and correspondingly several receivers, may be provided on separate paths beside each other or above each other. If desired, these transmitters and receivers can be accommodated within a common housing. However, it is also possible to locate along the same travel or conveying path different devices, one behind the other, so that the control command issuing from the device is dependent upon a given succession or code of control pulses. In this manner the control effect can be varied in accordance with different possibilities of signal combination (coded signals).

In the embodiment described above with reference to FIG. 1, the individual magnet 9 may be replaced by a number of magnets distributed along the travel path. These magnets may have respectively different directions of magnetization. The system may further be so modified that on the transmitter side as well as on the receiver side, a displacement by a given angle, for example 90°, is obtained. As mentioned above, the magnet 9 may be displaceable not only in the direction of the arrow 10, but also in the direction perpendicular to the plane of illustration. In an analogous manner, the receiver may consist of one or more units which are differently oriented or have a multiple orientation. It may further be mentioned that, if desired, the strength of the magnetization may also be utilized for releasing respectively different control signals.

In some cases it is possible to release respectively different control operations by graduating the magnetizing strength, without rendering the signal transmission unreliable. This is particularly useful in cases where the spacing between the receiver and transmitter at the signal transmitting moment is relatively slight and essentially always the same. Due to the high sensitivity semiconductor or Hall-voltage generator, a differentiating sensing of the control currents according to their respective amplitudes can be obtained. In comparison with permanent magnets, the use of electromagnets has the advantage that a change of the control signal can be effected rapidly at any time because the strength and direction of the magnetization can be controlled at will by electric switching of control devices.

Figure 2:
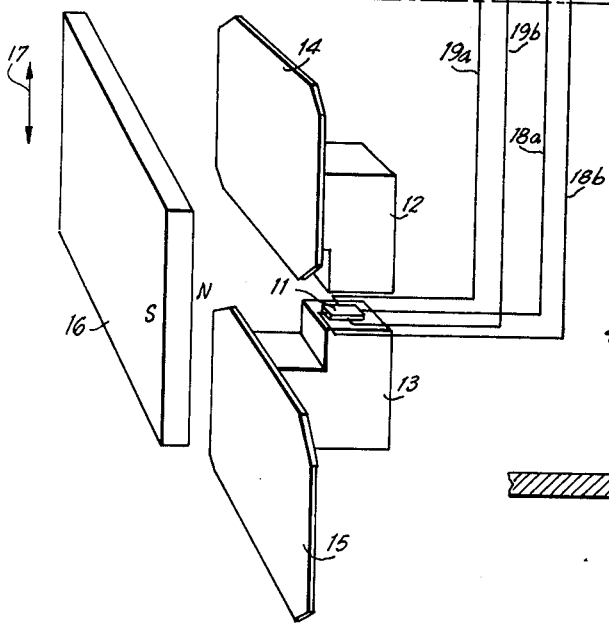

In the embodiment of a sensing device and control system according to the invention shown in FIG. 2, the receiver is provided with a Hall plate 11 of indium arsenide or indium antimonide and is located within a gap formed by the two limbs 12 and 13 of a magnetizable yoke. The two limbs are shown pulled apart from each other to prevent obscuring the Hall plate, but it will be understood that the two limbs are actually fastened together in substantially face-to-face contact with the Hall plate 11 but electrically insulated therefrom. The limbs may consist of a laminated stack of sheets preferably made of soft-magnetic material of high permeability. As in the embodiment of FIG. 1, the yoke forms an open magnetic circuit with two pole ends located in the same plane. Placed upon the ends of the U-shaped, laminated iron yoke are soft-magnetic sheets 14 and 15 which form extended pole surfaces.

The transmitter member is shown to consist of a permanent magnet 16 which is movable relative to the stationary receiver in the direction indicated by the double-headed arrow 17. The Hall generator is energized from current supply buses R, O through a current supply unit 18 which also energizes an amplifier 19. Leads 18a, 18b pass current from unit 18 through the Hall plate 11. The plate has two Hall electrodes located half way between the current supply terminals. The electrodes are connected by leads 19a, 19b in the input circuit of the amplifier 19. The Hall voltage generated by the plate 11 and amplified in amplifier 19 is supplied from the amplifier output terminals 20 and 21 to the relays, contactors or other power control devices to be actuated.

If the current supplied to the Hall plate 11 from power supply unit 18 through leads 18a, 18b is direct current, the Hall voltage acting upon the amplifier 19 when the transmitter magnet 16 approaches the sensing head is unidirectional. However, the power supply unit 18 may also energize the Hall plate with alternating current of any desired frequency. In the latter case, the Hall voltage supplied to amplifier 19 is modulated and has the same frequency as the current supply so that the amplifier 19 may consist of an A.-C. amplifier and, if desired, the devices to be controlled by the amplifier may be responsive to the selected frequency.

Figure 4:
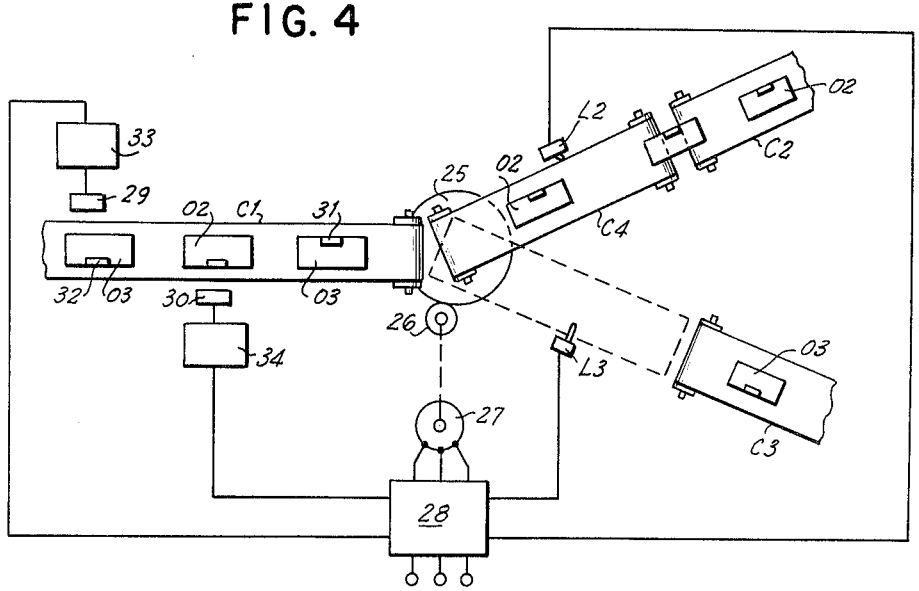
FIG. 4 shows schematically a conveyor control system.

According to FIG. 4, various objects, denoted by O2 and O3, arrive on an endless-belt conveyor C1 from which they are passed selectively either onto a stationarily located conveyor belt C2 or onto another conveyor C3. This is done by means of an intermediate endless-belt conveyor C4 which can be switched from the illustrated full-line position to the position shown by broken lines. The conveyor C4 is turned from one to the other position by means of a gear 25 which meshes with a gear 26 driven from a reversible motor 27. The control unit 28 of the motor operates to make the motor run in one or the other direction in response to the operation of two static sensing devices 29 and 30 which are mounted on opposite sides of the conveyor C1 and which correspond to the semiconductor devices shown in FIGS. 1 and 2.

The semiconductor sensing devices 29, 30 are connected with the motor control unit 28 through respective amplifiers 33, 34, such as the transistor amplifiers mentioned above. The control unit 28 is further under control by respective limit switches L2, L3 which are normally closed and which open when contacted by the intermediate conveyor C4.

Each of the objects O2, O3 carries on one or the other side a permanent magnet 31, 32. When this magnet travels by one of the sensing units, that particular unit is effective to control the switching conveyor C4 so that the particular object will be passed onto the proper conveyor C2 or C3.

Figure 5:
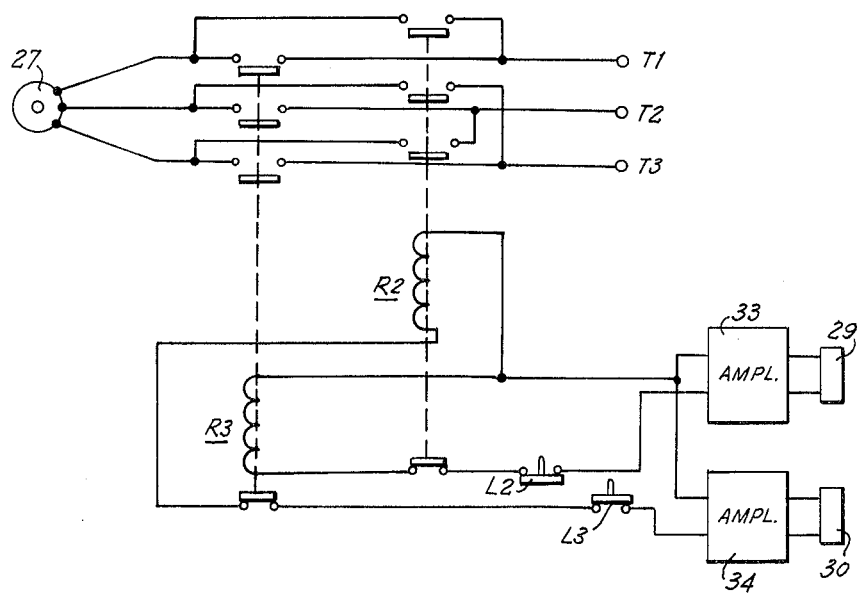
FIG. 5 is a circuit diagram of the same control system.

FIG. 5 shows the reversible motor 27 controlled by two mutually interlocked reversing contacts R2 and R3, and the connection of these contactors with the above-mentioned amplifiers 33, 34 and limit switches L2, L3. It will be noted that the switching conveyor C4 is driven by the motor 27 to move to its other position only when this is needed for changing the travel path of the particular object. For simplicity, the sensing units 29 and 30 are shown at different locations of the conveyor C1. This would require adding to the control system a suitable time-delay device in order to prevent the two sensing units from operating simultaneously. However, the two units 29 and 30 may also be located at the same point along the travel path of conveyor C1.

Figure 6:
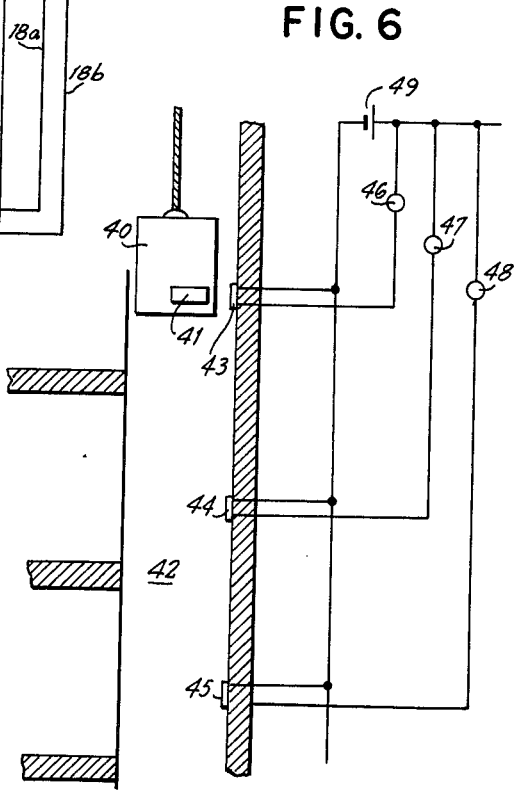
FIG. 6 is a schematic diagram of an elevator control system.

In FIG. 6, an elevator cab is denoted by 40. It is provided with a magnet 41 which, as the cab travels in the shaft 42, actuates static sensing units 43, 44, 45 when arriving at respectively different floors. The sensing devices corresponding to those shown in FIG. 1 or FIG. 2 and described above. They are individually connected with receiving units 46, 47, 48 which are selectively energized from a current source 49 when the magnet 41 is located opposite a particular sensing unit. When such a system is simply used for signalling purposes, the magnet 41 may consist of a permanent magnet, and the units 46, 47, 48 may consist of relays for operating respective signals to indicate the location of the elevator cab. However, the units 46, 47, 48 may also form part of levelling devices. In this case, it is preferably to use as magnet 41 an electromagnet actuated by a switch, for example when the operator causes the elevator to slow down and stop.

The explanatory diagram shown in FIG. 7 relates generally to the use of the invention for determining the relative position of two objects A, B movable relative to each other, for such purposes as recording the position, or controlling the travel or other position-dependent data. One of the objects, namely the transmitting object A, is of such character as to produce a distance-dependent change of magnetic field conditions at the location of the receiving object B. The path of the transmitting object A relative to object B is denoted by an arrow $s$, and one of the positions through which the object A passes is shown at A'. As shown, the transmitter object A comprises a means for producing a magnetic field, represented by a permanent magnet N-S from which the field acting upon object B originates. The object B is provided with a sensing device as described above, only the semi-conductor wafer W of the device being shown in FIG. 7.

According to the diagrammatic illustration in FIG. 8, the magnetic field at the locality of the receiving object B does not issue from or in the transmitter object A but has a different origin A'. The transmitter object A comprises a ferromagnetic member C which varies the magnetic field in its vicinity and thus acts upon the receiver object.

As stated above, FIGURES 9 and 10 indicate the Hall voltage $U_H$ of a Hall generator in dependence upon the position of magnets. The magnets of FIG. 9 are of a different shape than those of FIG. 10. The magnets N-S are moved in the direction of the path $s$. The Hall generator is mounted in a magnet system constructed according to FIG. 2. The Hall voltage is entered for different distances $D_1$ to $D_3$ between the receiver and the magnet.

In FIG. 9 a horseshoe magnet N-S is used as a transmitter. When this magnet is accurately symmetrical about the center of the receiver head (position I), then the Hall voltage reaches its maximum value. Upon displacing the U-magnet in the positive or negative direction (positions II, III) the Hall voltage declines until it reaches the value zero for large distances. The value of the maximum increases with a decrease in spacing D between the transmitter magnet and the receiver head perpendicular to the direction of motion.

A device with a Hall-voltage curve according to FIG. 9 can be used with advantage as a signalling or indicating device, particularly for the purpose of controlling the speeds of movable objects, such as elevator cages, vehicles, conveyor belts, mine hoists, etc. A pulse is produced in the receiver which reaches its maximum value when the U-magnet is located in symmetrical relation to the receiver head (position I). The pulse then issued can serve for releasing the desired control operation. When using two horseshoe magnets as transmitters, the device is also suitable for speed control.

FIG. 10 indicates the Hall voltage as a function of the distance $s$, when a flat magnet is used instead of the horseshoe magnet. As shown in FIG. 10, the magnetic axis of the flat magnet is generally parallel to the Hall plate and to the magnetic gap, particularly in control position I. In contrast to FIG. 9, the Hall voltage is zero when such flat magnet is used and at the instant such magnet is located in accurate symmetry above the middle of the receiver head (position I). Upon displacing the magnet in positive direction, the Hall voltage increases, passing through a maximum, and thereafter declines for large distances $s$ down to the zero value (position II). The steepness at the zero point and the magnitude of the maximum increase with a decrease in distance D between transmitter magnet and receiver head. The same conditions with a negative sign of the Hall voltage apply to displacements in the negative direction, the magnetic flux in the air gap of the receiver head then extending in the reverse direction (position III).

A device with a Hall-voltage characteristic as shown in FIG. 10 is applicable to advantage for controlling two relatively movable objects to assume an accurate juxtaposition, for example for the purpose of leveling mine hoists, elevators, vehicles or conveyor belts. However, the Hall voltage can also be utilized for speed control.

It will be obvious to those skilled in the art, upon a study of this disclosure, that our invention permits of various modifications with respect to design features and circuitry and hence may be embodied in systems and apparatus other than particularly illustrated and described herein, without departing from the essence of our invention and within the scope of the claims.

We claim:

1. A system for determining the position and direction of movement of a moving object comprising means producing a magnetic field, said means including a first structure carrying magnetic material influencing said field, position-responsive sensing apparatus comprising a ferromagnetic structure magnetizable by proximity to said magnetic field, a magnetic field repsonsive Hall voltage member of semiconducting substance joined with said ferromagnetic structure for varying the Hall voltage of said member when said ferromagnetic structure is so magnetized, the said structures being mounted for relative displacement, said Hall voltage member having Hall electrode means, and an electric control circuit connected to the Hall electrode means and responsive to change in Hall voltage caused by said relative displacement, said ferromagnetic structure comprising a magnetizable yoke formed of two separate magnetizable limbs, each having an end pole face, the limbs forming a magnetic circuit having two opposite flux gaps, a first one of said gaps being in a central region of the yoke, the second gap being between the end pole faces, the Hall voltage member being a semiconductor plate having its large area faces disposed transversely of the flux path in the first gap, said magnetic material influencing said field comprising a magnet that traverses the second gap traversing over one end pole face and then over the other end pole face, during said relative displacement, the magnetic axis of which magnet between the poles is transverse to the displacement path, so that said Hall voltage passes from a positive maximum value through a zero value to a negative maximum value during said traverse when one of said first structure and said ferromagnetic structure moves relative to the other in one direction from a first point on one side of the other structure to a second point on the opposite side of said other structure and said Hall voltage passes from a negative maximum value through a zero value to a positive maximum value when said one of said first structure and said ferromagnetic structure moves relative to the other in the opposite direction from said second point to said first point thereby indicating the position and direction of movement of the moving structure.

2. The system defined in claim 1, the system being a leveling system for elevators, the first structure forming the elevator shaft having a plurality of floors, there being a magnet as defined at each floor.

3. A system for determining the position and direction of movement of a moving object comprising means producing a magnetic field, said means including a first structure carrying magnetic material influencing said field, position-responsive sensing apparatus comprising a ferromagnetic structure magnetizable by proximity to said magnetic field, a magnetic-field responsive Hall voltage member of semiconducting substance joined with said ferromagnetic structure for varying the Hall voltage of said member when said ferromagnetic structure is so magnetized, the said structures being mounted for relative displacement, said Hall voltage member having Hall electrode means, and an electric control circuit connected to the Hall electrode means and responsive to change in Hall voltage caused by said relative displacement, said ferromagnetic structure comprising a magnetizable yoke formed of two separate magnetizable limbs, each having an end pole face, the limbs forming a magnetic circuit having two opposite flux gaps, a first one of said gaps being in a central region of the yoke, the second gap being between the end pole faces, the Hall voltage member being a semiconductor plate having its large area faces disposed transversely of the flux path in the first gap, said magnetic material influencing said field comprising a magnet that traverses the second gap, traversing over one end pole face and then over the other end pole face, during said relative displacement, the magnetic axis of which magnet is transverse to the displacement path, the two end pole faces of the yoke being located in a plane normal to that defined by the first gap and normal to said semiconductor plate, said displacement path extending in front of said plane, the magnet being a flat plate, the displacement direction being in the plane of the plate, the magnetic axis of the plate being transverse to the opposite flat surfaces thereof, the length of the plate in the displacement direction being greater than the width of the second gap, to over-lap the gap during its displacement, so that said Hall voltage passes from a positive maximum value through a zero value to a negative maximum value during said traverse when one of said first structure and said ferromagnetic structure moves relative to the other in one direction from a first point on one side of the other structure to a second point on the opposite side of said other structure and said Hall voltage passes from a negative maximum value through a zero value to a positive maximum value when said one of said first structure and said ferromagnetic structure moves relative to the other in the opposite direction from said second point to said first point thereby indicating the position and direction of movement of the moving structure.

4. The system defined in claim 3, the system being a leveling system for elevators, the first structure forming the elevator shaft and having a plurality of floors, there being a magnet as defined at several of the floors.

5. Position-responsive sensing apparatus for transmitting control signals from a transmitter unit to a receiver unit of which one is movable relative to the other so as to pass each other along a given path, comprising Hall voltage means on said receiver unit having a Hall plate and respective pole shoes terminating in sequence along said path, magnetic means on said transmitter unit one pole closer to said path than the other and positioned to link said pole shoes in sequence when said transmitter and said receiver pass each other, said Hall voltage means producing a Hall voltage passing from a positive maximum value through a zero value to a negative maximum value when one of said transmitter unit and said receiver unit moves relative to the other unit in one direction from a first point in said path on one side of said other unit to a second point in said path on the opposite side of said other unit and said Hall voltage passing from a negative maximum value through a zero value to a positive maximum value when said one of said transmitter unit and said receiver unit moves relative to the other unit in the opposite direction from said second point to said first point thereby indicating the position and direction of movement of the moving unit.

6. Position-responsive sensing apparatus for transmitting control signals from a transmitter unit to a receiver unit of which one is movable relative to the other so as to pass each other along a given path, comprising Hall voltage means on said receiver unit having a Hall plate and respective pole shoes terminating in sequence along said path, magnetic means on said transmitter unit one pole closer to said path than the other and positioned to link said pole shoes in sequence when said transmitter and said receiver pass each other, said magnetic means including a flat plate parallel to said path magnetized so that one flat face of said plate is north polar and the other face south polar, said Hall voltage means producing a Hall voltage passing from a positive maximum value through a zero value to a negative maximum value when one of said transmitter unit and said receiver unit moves relative to the other unit in one direction from a first point in said path on one side of said other unit to a second point in said path on the opposite side of said other unit and said Hall voltage passing from a negative maximum value through a zero value to a positive maximum value when said one of said transmitter unit and said receiver unit moves relative to the other unit in the opposite direction from said second point to said first point thereby indicating the position and direction of movement of the moving unit.

References Cited by the Examiner

UNITED STATES PATENTS

| | | | |
|---|---|---|---|
| 1,961,133 | 6/34 | Brown. | |
| 2,536,805 | 1/51 | Hansen | 322—345 |
| 2,784,851 | 3/57 | Bretschneider | 214—11 |
| 2,792,080 | 5/57 | Dunlop | 187—29 |
| 2,907,834 | 10/59 | Duinker et al. | 324—45 X |
| 2,946,955 | 7/60 | Kuhrt | 330—6 X |
| 3,079,535 | 2/63 | Schultz | 317—201 |

FOREIGN PATENTS 868,503  2/53  Germany.

OTHER REFERENCES

Pearson: The Review of Scientific Instruments, volume 19, No. 4, April 1948, pages 263–265.

Ross et al.: Journal of Scientific Instruments, volume 34, December 1957, pages 479–484.

ORIS L. RADER, *Primary Examiner.*

ELI J. SAX, BENNETT G. MILLER, *Examiners.*